(No Model.) 2 Sheets—Sheet 2.

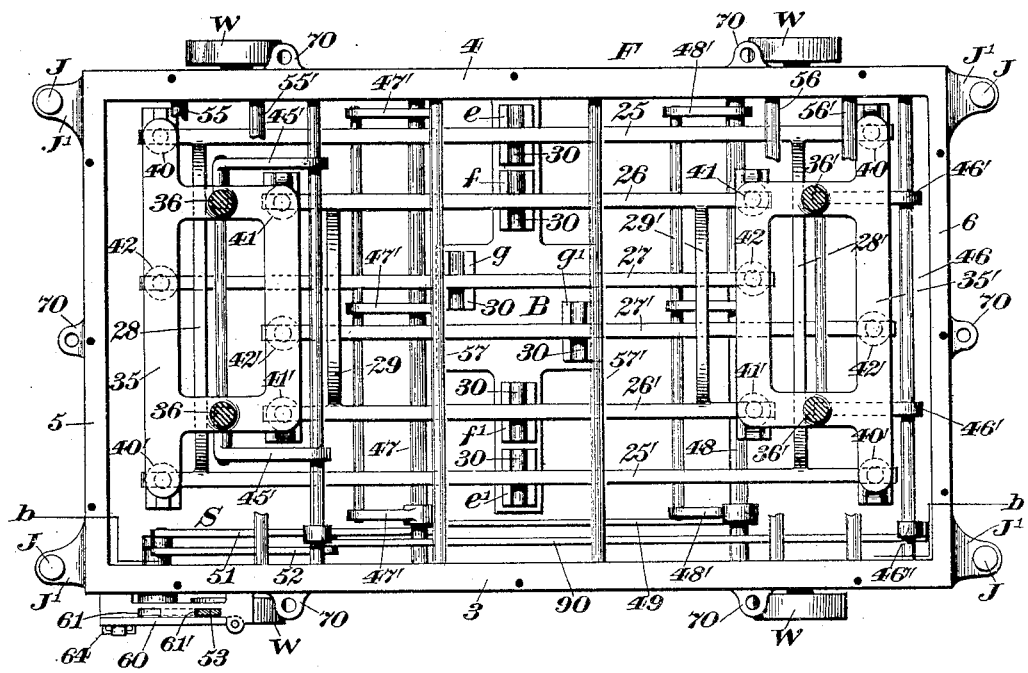

F. H. RICHARDS.
WEIGHING MACHINE.

No. 578,162. Patented Mar. 2, 1897.

Witnesses
Chas. F. Steward
Fred. J. Dole.

Inventor
F. H. Richards.

THE NORRIS PETERS CO., PHOTO-LITHO., WASHINGTON, D. C.

UNITED STATES PATENT OFFICE.

FRANCIS H. RICHARDS, OF HARTFORD, CONNECTICUT.

WEIGHING-MACHINE.

SPECIFICATION forming part of Letters Patent No. 578,162, dated March 2, 1897.

Application filed September 21, 1896. Serial No. 606,490. (No model.)

*To all whom it may concern:*

Be it known that I, FRANCIS H. RICHARDS, a citizen of the United States, residing at Hartford, in the county of Hartford and State of Connecticut, have invented certain new and useful Improvements in Weighing-Machines, of which the following is a specification.

This invention relates to balances of that class embodying a pair of platforms which are supported and balanced upon opposite ends of and maintained in parallelism by means which are poised and rock upon pivots on a suitable beam-support.

One object of the invention is to furnish an improved simple, compact, and portable balance embodying a highly-sensitive and accurately-poised weighing mechanism capable of sustaining a considerable weight, and which balance is especially adapted for use as a testing machine or apparatus for proving the weighing accuracies of automatic or other weighing-machines before placing them upon the market, and to so construct and organize the coöperative mechanisms or parts of the balance as an entirety that the beam mechanism and platforms may be independently shifted out of engagement with their respective supports and locked in an inoperative position against accidental movement, so as to obviate injurious wear of bearing-surfaces, such as the knife-edges, during shipment or when the balance is not in use, and to provide means, in connection with the platforms and beam mechanism, whereby said platforms and beam mechanism may be simultaneously shifted from their operative to their inoperative positions with relation to their respective supports, or vice versa, and locked against movement in the former of said positions.

A further object of the invention is to provide in a balance of the class specified and in connection with beam mechanism and platforms which are shiftable into an operative and inoperative position relatively to their respective pivotal supports means for simultaneously shifting the platforms and beam mechanism relatively different distances out from and into operative relation with their respective supports, and means for guiding said platforms and beam mechanisms during the shifting movements thereof to insure an accurate positioning of their pivots or knife-edges when shifted to an operative position.

Figure 4:
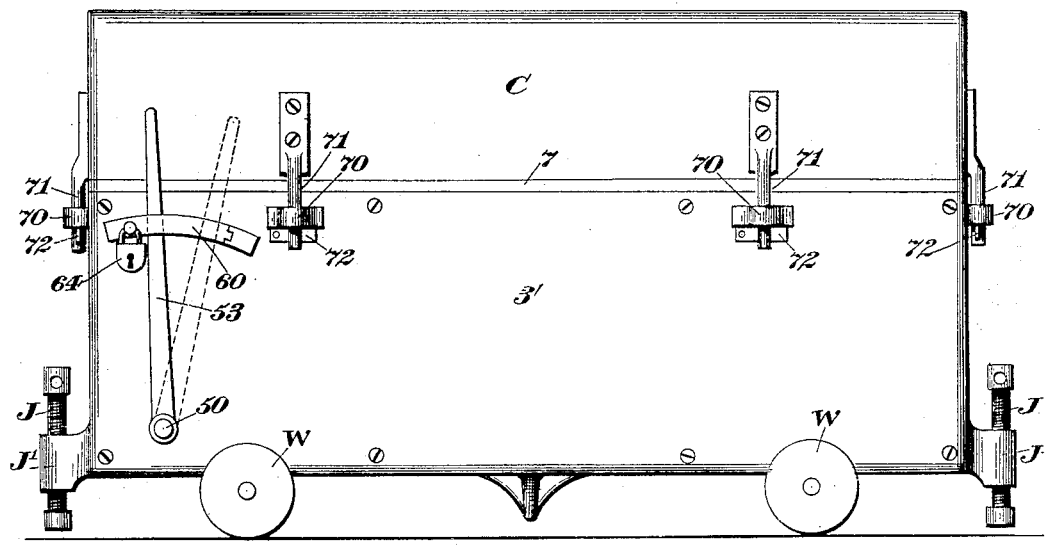
Figure 3:
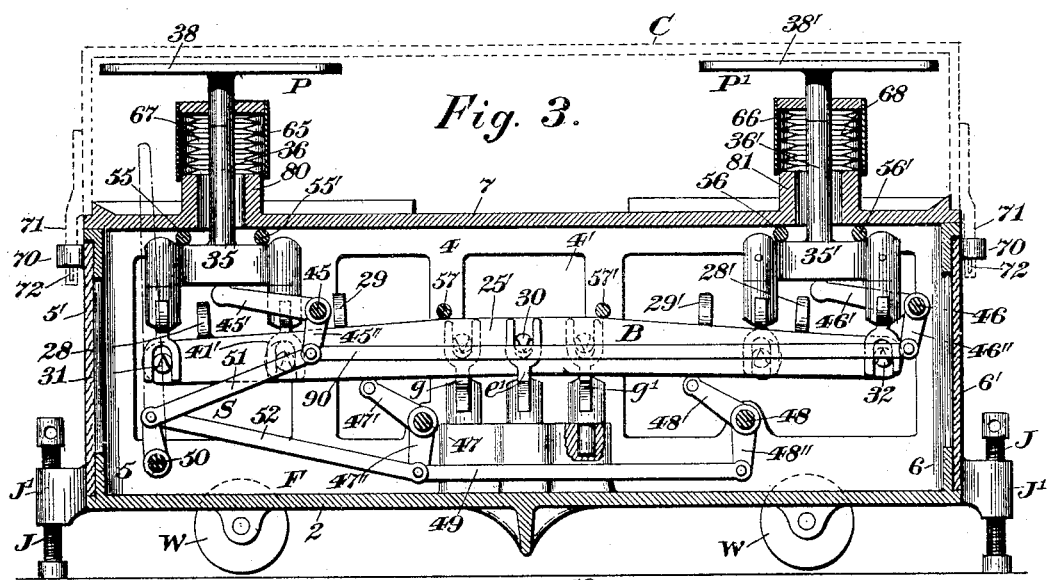
Figure 5:
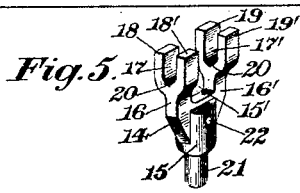

In the drawings accompanying and forming part of this specification, Figure 1 is a sectional plan view, taken on a line corresponding with the dotted line *a a*, Fig. 2, of my improved balance or testing-machine, certain of the parts being broken away to illustrate more clearly certain details thereof. Fig. 2 is a sectional side elevation of the balance or testing-machine, the said section being taken on the line corresponding to the dotted line *b b*, Fig. 1, and showing the platforms and beam mechanism in operative or working positions, said beam mechanism being shown tilted at one end thereof by means of a weight resting upon the table. Fig. 3 is a sectional side elevation similar to Fig. 2, showing the platforms and beam mechanism lifted off of their respective pivot-supports and held as against movement in an inoperative position or in the position they should occupy when the balance is not in use or is boxed for shipment. Fig. 4 is a side elevation of the balance apparatus inclosed ready for shipment, the shifting-lever for the beam and platform-lifting mechanism being shown locked in the position it occupies when the platforms and beam mechanism are in the positions shown in Fig. 3; and Fig. 5 is a perspective view of one of the knife-edge bearings.

Similar characters designate like parts in all the figures of the drawings.

My improved balance or testing apparatus in the preferred form thereof shown in the drawings comprises a suitable framework, (designated in a general way by F,) including supports for beam mechanism; beam mechanism (designated in a general way by B) shiftable from an operative to an inoperative position with relation to its supports, embodying a plurality of poising or balance beams located side by side in substantial parallelism and pivotally supported or poised upon the beam-supports; a pair of platforms (designated in a general way by P and P', respectively) supported one upon each end of the beam mechanism at opposite sides, respectively, of the pivots or supports of the beams for vibratory movements in parallel planes, and means, hereinafter fully described, for shifting the beam mechanism and platforms into inoperative positions with relation to their respective supports and for locking said beam mechanism and platforms as against accidental movement in their inoperative positions.

The framework F for supporting and housing the beam mechanism and other operative parts of the balance or testing apparatus comprises in the preferred form thereof shown in the drawings a box-like structure composed of the base 2, side walls 3 and 4, respectively, end walls 5 and 6, and top wall 7. The side and end walls of the frame are shown having panel-openings, through which access may be had to the mechanism inclosed by the box-like framework.

In the drawings the base 2, side walls 3 and 4, and end walls 5 and 6 are shown, respectively, in one piece, and the top plate is shown removably secured to flanges at the upper edges of said side and end walls. It will be obvious, however, that the entire box-like structure may be cast in one piece and of any suitable general formation, in which case the panel-openings at the ends of the box-like framework will be of sufficient area to readily admit and facilitate the setting up of the working parts of the apparatus.

For the purpose of excluding air and dust from the interior of the box-like structure, which might be admitted through the panel-openings, the panel-openings in the end walls 5 and 6 are shown closed by panels 5' and 6', which for the purpose of adding but little to the weight of the structure will usually be of wood and may be secured in place by screws or in any suitable manner, and the panel-openings in the side walls 3 and 4 may be closed by supplemental side walls 3' and 4', preferably of wood, and which are shown secured to the side walls 3 and 4 by suitable screws.

As a convenient means for supporting the beam mechanism of the apparatus I have provided a series of knife-edge bearings, (herein shown as six in number and designated in a general way by $e$, $e'$, $f$, $f'$, $g$, and $g'$, respectively,) and which bearings may be supported in any suitable or well-known manner upon a reinforced portion of the base 2 of the framework, as shown, for instance, in Figs. 1, 2, and 3.

In the organization illustrated of the knife-edge bearings, which constitute the pivot-supports for the beam mechanism, the bearings $e$ and $e'$ and $f$ and $f'$ are supported with their bearing-faces in axial alinement and in a plane transverse to the longitudinal axis of the beam mechanism B and midway between the vertical axes of the two platforms P and P', the knife-edge bearings $e$ and $f$ being shown located at one side of the longitudinal axis of the beam mechanism and $e'$ and $f'$ at the opposite side of said axis. The intermediate knife-edge bearings $g$ and $g'$ are shown located one at each side of the longitudinal axis of the beam mechanism and one at each side the axial line of the knife-edge bearings $e$ and $e'$ and $f$ and $f'$, as will be understood by reference to Figs. 1, 2, and 3 of the drawings.

Inasmuch as all of the knife-edge bearings are shown of substantially the same construction, a description of one set of pivot-bearings will suffice for all.

Each knife-edge bearing in the preferred form thereof (shown most clearly in Fig. 5 of the drawings) comprises two pivotally-connected members 14 and 15, the one, 14, of which is bifurcated to form bearing-arms 16 and 16', which also constitute guide-arms for straddling or preventing transverse or lateral movement of the beam supported between said arms, and which arms 16 and 16' are also bifurcated or centrally slotted, as shown at 17 and 17', for a short distance inward from the outer ends thereof and transversely to the guideway formed by the arms 16 and 16' to form two pairs of guide-arms, (designated by 18 and 18' and 19 and 19', respectively,) which are adapted for engaging opposite sides of the knife-edge pivots of the beam and for preventing accidental movement of said beam longitudinally, the arms of each pair of arms being located in parallelism and having a V-shaped bearing-face 20 intermediate the inner connected ends thereof for supporting the knife-edges of the beam, as will be hereinafter more fully described.

As a means for supporting the knife-edge bearings the carrier member 15 of each bearing is shown having a cylindrical extension or pin 21 at the lower end thereof, which is preferably of smaller diameter than the main portion of the member 15 and is seated in a socket formed in the reinforced portion of the base 2, as shown most clearly in Fig. 3 of the drawings.

As a means for connecting the two members 14 and 15 of the knife-edge bearing so that one of said members may have a slight rocking movement relatively to the other member the carrying member 15 is slotted transversely at the extreme outer end thereof, and the joining-web of the two arms 16 and 16' is seated in the slot and pivotally supported by means of a pivot-pin 22, extending transversely through the member 15 and said web, as will be readily understood by reference to Fig. 5 of the drawings.

The construction and organization of beam-support described in the preceding paragraphs provide simple and convenient guides for centering the pivots of the beam with respect to the pivot-bearings and also positively hold the beam as against movement in a longitudinal or transverse direction. Such construction of the member 14 of the bearing provides practically two relatively-transverse guideways 15' and 17', the former of which engages the opposite side faces of the beam and prevents transverse movement thereof, and the latter of which engages the opposite side faces of the transversely-disposed pivots of said beam and prevents longitudinal movement of said beam. The two pairs of arms 18 and 18' and 19 and 19' will be of sufficient length to facilitate a considerable movement of the beam vertically without disengagement of the pivot from the guideway 17', so that when said beam is shifted to an inoperative position, with the pivot out of engagement with the V-shaped face of the bearing, it will still be held against accidental longitudinal and transverse movements.

The beam mechanism of the balance or testing apparatus in the preferred form thereof shown most clearly in Figs. 1, 2, and 3 of the drawings comprises a plurality of horizontally-disposed and substantially-parallel beams, (herein shown as six in number and designated by 25, 25', 26, 26', 27, and 27', respectively,) the two beams 25 and 25' being shown of considerably greater length than the beams 26 and 26' and being connected together near their ends by cross-bars 28 and 28', and the two beams 26 and 26' being similarly connected together near their ends by cross-bars 29 and 29', thus forming practically two rectangular beam-frames, one of which is located within the other, as shown most clearly in Fig. 1 of the drawings.

Each beam is furnished at the middle portion thereof with a knife-edge pivot 30, the knife-edges of which project beyond the opposite side faces, respectively, of the beam, and said beam also has at opposite ends thereof similar pivots 31 and 32, respectively. These knife-edge pivots may be the same in all material respects as the knife-edge pivots described in Letters Patent of the United States No. 559,750, granted to me May 5, 1896, to which reference may be had, or may be of any other suitable general construction.

Inasmuch as the pivots for all of the beams of the beam mechanism will in practice be of substantially the same construction, and inasmuch as the pivots of the separate beams of said mechanism are similarly located on their respective beams, a description of the pivots in connection with one beam is deemed sufficient. The knife-edge pivots 30 of the two beams 25 and 25' are supported, respectively, upon the knife-edge bearings $e$ and $e'$, and the pivots 30 of the two beams 26 and 26' are supported, respectively, on the bearings $f$ and $f'$ and in axial alinement with the knife-edges 30 of the beams 25 and 25', said bearings being located substantially midway between the vertical axes of the platforms P and P'. The knife-edges at the middle portions of the beams 27 and 27' are supported, respectively, upon the bearings $g$ and $g'$, which are located one at each side of the longitudinal axis of the bearings $e$, $e'$, $f$, and $f'$ and one at each side of the longitudinal axis of the beam mechanism, as will be clearly understood by reference to Figs. 1 and 2 of the drawings.

The platforms P and P', which may be of any suitable general construction, are supported one at each end of the beam mechanism for movements in vertical planes, and in the preferred form thereof shown in the drawings each platform comprises a base 35 35', two table-supporting posts or uprights 36 36', extending upward from the bases through dust-proof bearings in the top wall 7 of the framework, and a tray or table 38 38', which may be supported in any convenient manner upon the two uprights 36 and 36'.

Inasmuch as the two platforms P and P' are shown of substantially duplicate construction and are supported in a similar manner upon opposite ends, respectively, of the beam mechanism, a description of one of said platforms is deemed sufficient for a clear understanding of the construction and organization of both.

For the purpose of supporting the two platforms P and P' upon the beam mechanism in such manner that the arms thereof will be at all times in parallel planes, so that the trays or tables of said platforms will have no tendency to move from their horizontal position, the base 35 35' of each platform is preferably of oblong skeleton construction and has its longitudinal axis in a plane transverse to the longitudinal axis of the beams. Posts or uprights 36 and 36', which support the trays or tables 38 38', are shown located, respectively, at opposite ends of the base, substantially midway between the two side edges of said base, and the base is shown supported at one side, near opposite ends thereof, upon the ends of the beams 26 and 26' of the inner frame of the beam mechanism, and is shown supported at the opposite side and near opposite ends thereof upon the ends of the two beams 25 and 25' of the outer frame of the beam mechanism, said base being provided at the points designated by 40 and 40' and 41 and 41' with knife-edge bearings, such as hereinbefore described, the ones 40 and 40' being supported upon the knife-edge pivots at the outer ends of the two beams 25 and 25', and the ones 41 and 41' being supported upon similar pivots at the outer ends of the two beams 26 and 26'.

Owing to the difference in length of the beams of the inner and outer frames of the beam mechanism, it will be seen that were the platforms supported only upon the opposite ends of the two frames of the beam mechanism said platforms would have a slight tilting movement during the vibratory movements of the beams. Therefore it is necessary to provide means in connection with said beams and platforms for maintaining the supporting posts or uprights of the tray or table in a vertical position, and for this purpose I have provided the equalizing-beams 27 and 27', one of which beams, as 27, has a pivotal connection at one end thereof with the base of the platform P in alinement with the axes of the outside bearings 40 and 40' and has a pivotal connection with the opposite base 35' of the platform P' in alinement with the inside bearings 41 and 41' thereof, and the other equalizing-beam has a pivotal connection at its outer end with the base of the platform P' in alinement with the outside bearings 40 and 40' of said base and has a pivotal connection at its opposite end with the base of the platform P in alinement with the inside bearings 41 and 41' of said base, said platforms being furnished at points designated at 42 and 42' with knife-edge bearings, such as hereinbefore described, which coöperate with and are supported upon the pivots at the outer ends of the two beams 27 and 27', as will be readily understood by reference to Fig. 1 of the drawings. These beams 27 and 27', as before stated, are supported midway of their lengths on bearings connected with the base 2 of the framework, and the distances between the central pivotal points of said beams and their pivotal connections with the bases of the two platforms are substantially equal to one-half the distance between the longitudinal axes of the two platforms P and P'. Thus it will be seen that by the provision of the equalizing-beams, one of which is connected with the outer side of the platform P and the inner side of the other platform P' and the other of which is connected with the inner side of the platform P and the outer side of the platform P', the difference in the movements of the inner and outer frames of the beam mechanism will be compensated for by the difference in movements of the two equalizing-beams 27 and 27', and the platforms will be held with their tray-supporting posts in a direct vertical plane and in parallelism with one another during the movements of the beam mechanism, as will be readily understood by any one familiar with this class of mechanism.

As a convenient means for lifting the beams of the beam mechanism into an inoperative position with their knife-edge pivots out of working engagement with their respective bearings, and for locking said beams against accidental movement in their inoperative positions with relation to their respective supports, and for simultaneously lifting the platforms P and P' into an inoperative position with their knife-edge bearings out of contact with the knife-edge pivots of the beams of the beam mechanism, and for locking said platforms in such inoperative position against accidental movement, I have provided a beam and platform shifting mechanism, (designated in a general way by S.)

The beam and platform shifting mechanism in the preferred form thereof shown in the accompanying drawings comprises four rock-shafts, (designated by 45, 46, 47, and 48, respectively,) which rock-shafts are supported at opposite ends in suitable bearings in the side walls 3 and 4 of the framework F of the apparatus; rockers 45' and 46', carried, respectively, by the rock-shafts 45 and 46 and having their outer ends in position for engaging and shifting the platforms P and P' into an inoperative position with respect to their supports; rockers 47' and 48', carried, respectively, by the rock-shafts 47 and 48 and embodying means for engaging the under sides of the beams of the beam mechanism and for shifting the said beams into an inoperative position with respect to their supports; crank-arms 45" and 46", fixed to the rock-shafts 45 and 46; a connecting-rod 90, uniting said crank-arms; crank-arms 47" and 48", fixed to the rock-shafts 47 and 48; a connecting-rod 49, connecting the two crank-arms 47" and 48"; an actuating crank-shaft 50, journaled in suitable bearings of the side walls of the framework and having a crank at the inner end, which is shown operatively connected with the crank-arm 45" and the crank-arm 47" by means of actuating-rods 51 and 52, respectively, said crank-shaft 50 being provided at its outer end with a connected hand-lever 53, which extends upward and is adapted to be engaged by a locking device, as hereinafter described.

By the provision of shifting mechanism for shifting the beams of the beam mechanism into an inoperative position relatively to their supports and for shifting the platforms into inoperative positions relatively to their supports I am enabled to prevent unnecessary wear of the knife-edges and their bearings when the apparatus is not in use during the transportation of the same from place to place, which materially prolongs the life and accurate working efficiency of said apparatus.

It will be obvious that I do not desire to limit this invention to the particular construction and organization of the mechanism shown in the drawings for shifting the beam mechanism and platforms into an inoperative position with relation to their respective supports, as these may be materially modified without departure from the invention.

In the drawings I have shown means for simultaneously shifting the beam mechanism and platforms into an inoperative position, but it will be obvious that said beam mechanism and platforms may be shifted independently of one another, although means for accomplishing this end by one operation is deemed advantageous.

When it is desired to shift the beams of the beam mechanism out of operative relation with their respective supports and at the same time shift the platforms out of operative relation with their respective supports, it is simply necessary to move the hand-lever from the position shown in dotted lines in Fig. 2 to that shown in dotted lines in Fig. 3, which, through actuating mechanism described, rocks the rock-shafts and connected rockers to the position shown in Fig. 3, which rockers lift the beams and platforms into an inoperative position with relation to their respective supports, the throw of the rockers which lift the platforms being somewhat greater than the throw of the rockers which lift the beam mechanism for obvious reasons.

For the purpose of limiting the lifting movements of the beams of the beam mechanism and the platforms I have provided two sets of stops, one set in operative relation with and adapted for limiting the vertical movement of the platform and the other set in operative relation with and adapted for limiting the vertical movement of the beams of the beam mechanism. The stops of the two platforms are arranged in pairs, those of one pair being designated by 55 and 55' and those of the other pair by 56 and 56', and the stops for limiting the vertical movement of the beams are shown as two in number and are designated by 57 and 57'. These stops are in the nature of rods extending transversely of and supported at their opposite ends in the framework, as will be understood by reference to Figs. 1, 2, and 3 of the drawings.

By reference to Fig. 3 of the drawings it will be seen that when the beam mechanism is in its inoperative position with respect to its supports the beams thereof are firmly held between the stops 57 and 57' and the outer ends of the two rockers 47' and 48' and that the bases 35 35' of the two platforms are firmly held, one base between the two stops 55 and 55' and the outer end of the rocker 45' and the other between the stops 56 and 56' and the outer end of the rocker 46', the beams and platforms being held as against movement longitudinally and transversely of the framework by reason of the peculiar constructions and organizations of their respective pivots and pivot-bearings, as hereinbefore fully described.

As a convenient means for locking the beam and platform shifting mechanism in its effective and ineffective position I have provided in operative relation with the upper ends of the lever 53 a locking device which in the preferred form thereof shown in Fig. 4 consists of a locking-plate 60, which is hinged to the side wall 3' of the framework and which has formed on the inner face thereof two lock-notches 61 and 61', adapted for receiving the upper end of the hand-lever 53 when the same is in the full or dotted line position shown in Fig. 4, said plate 60 when in its closed position being locked to the side wall by any suitable means, such as by the padlock 64, as shown in the drawings.

As a means for preventing the admission of dust or air to the bearings through which the tray-supporting posts of the platforms extend said bearings are shown in the nature of axially-recessed bosses 80 81, formed on the upper face of the upper wall 7 of the framework, and the posts are furnished with tubular caps 65 and 66, which are closed at their outer ends and telescoped at their inner ends with the tubular bearings or bosses 80 81 and are provided upon their interior with bellows 67 and 68, which will preferably be formed of leather and which are located between the upper end of the bosses and the inner faces of the upper walls of the caps 65 and 66, as will be readily understood by reference to Fig. 3 of the drawings. It will be obvious, however, that this means of excluding dust and air from the interior of the framework may be materially modified without departure from this invention.

As shown in full lines in Fig. 4 and dotted lines in Fig. 3, I have shown in connection with the framework of the apparatus a cover C, which is of box-like construction and is adapted to be secured to the side and end walls of the base of the framework F in any suitable manner. This cover is provided for inclosing the principal portion of the apparatus—to wit, the platform—when the apparatus is not in use or when it is desired to transfer the same from one place to another.

As a means for locking the cover C to the framework F, I have shown the framework provided with a series of perforated bosses 70 and have shown the cover furnished with a series of pintles 71, which when the cover is in the position shown in Fig. 4 extend through the perforations in the bosses and are held against movement by means of keys 72, which pass through perforations in the lower ends of the pintles and bear against the under faces of the bosses and hold the cover against vertical displacement. It will be obvious, however, that the cover might be secured to the framework in many ways with the same results.

For convenience of transportation I have provided the framework F of the apparatus with a series of wheels W, which are adapted for resting upon the floor or counter, and I have also provided, in connection with said frame, a series of jack-screws J, which extend through lugs J' and are adapted for adjustment to lift the frame, so that the wheels will be out of contact with the floor or counter, said jack-screws also constituting means for adjusting the apparatus as a whole to the proper level.

Having described my invention, I claim—

1. A balance comprising a suitable framework embodying beam-supports; beam mechanism comprising a plurality of beams located side by side in substantial horizontal parallelism and pivotally supported upon beam-supports; a pair of platforms supported one upon each end of the beam mechanism for vertical movement; means for retaining the platforms in parallelism; and means for shifting the beam mechanism and platforms out of operative relation with one another and into an inoperative position with relation to their respective supports.

2. A balance comprising a suitable framework, balance-beams pivotally supported on said framework, and platforms pivotally supported upon said beams; beam and platform shifting mechanism in operative relation with the beams and platforms and operable for simultaneously shifting the beams and platforms into an inoperative position with relation to their respective supports and also operable for carrying said beams and platforms into operative position with relation to their respective supports; stops for limiting the shifting movements of the beams and platforms; and means for holding the beams and platforms against accidental movement in their inoperative positions.

3. The combination with a balance-beam supported for oscillatory movement, and with a platform removably supported at each end of said beam; of a rock-shaft having a rocker in operative relation with each platform; one or more rock-shafts, each having a rocker, in operative relation with said beam; and actuating mechanism in connection with said rock-shaft and effective for rocking the rocker to shift the beam and platforms out of operative relation with each other and into an inoperative position with relation to their respective supports.

4. In an apparatus of the class specified, the combination with beam mechanism pivotally supported for oscillatory movement, and with platforms pivotally supported one at each end of said beam mechanism; of beam and platform shifting mechanism embodying rockers in operative relation with the beam mechanism and operable for shifting the beam mechanism out of operative relation with its supports; rockers in operative relation with the platforms and operable for shifting the platforms out of operative engagement with the beams; connecting devices between the several rockers; an actuator in operative connection with said connecting devices; and a locking device for locking the actuator in its different positions.

5. In an apparatus of the class specified, the combination with a suitable framework; of beam mechanism comprising two beam-frames located one within the other in substantially horizontal parallelism and pivotally supported for oscillatory movement; a platform carried at each end of said beam mechanism and pivotally connected with each of said beam-frames; and equalizing-beams pivotally supported upon the framework and so connected with opposite platforms as to retain said platforms in parallelism during the oscillatory movements of the beams.

6. In an apparatus of the class specified, the combination with a suitable framework; of two sets of beams of relatively different lengths pivotally supported side by side with their axes of movement coincident; two vertically-movable platforms each pivotally supported at opposite sides of its vertical axis upon the outer ends of the long and short beams, respectively; oscillatory means for maintaining the platforms with their vertical axes in parallel planes; shifting devices in operative relation with the beams and platforms and operable for shifting the platforms out of operative relation with the beams and simultaneously shifting the beams out of operative relation with their supports; stops for limiting the shifting movement of the beams and platforms; and means for locking the beams and platforms in their inoperative positions.

7. The combination, with a suitable framework having knife-edge bearings, of oscillatory beams having knife-edge pivots at the middle portions thereof movably supported on said bearings and also having knife-edge pivots at opposite ends thereof; platforms having knife-edge bearings supported upon the knife-edge pivots at opposite ends of the beams; and means for shifting the knife-edge pivots and knife-edge bearings out of operative engagement with one another.

8. In an apparatus of the class specified, the combination with a suitable framework having a knife-edge bearing embodying two relatively-transverse guideways and a V-shaped bearing-face; of a beam supported for oscillatory movement in one of said guideways and having the knife-edge pivots supported in the other guideway; two platforms pivotally supported at opposite ends, respectively, of said beam; beam and platform shifting devices operable for shifting the beam with its knife-edge pivot out of engagement with the bearing-face of the knife-edge bearing; and stop devices for preventing the accidental displacement of the beam and pivot from their respective guideways.

FRANCIS H. RICHARDS.

Witnesses:
F. N. CHASE,
BENTON N. PARKER.